United States Patent
Iino et al.

(10) Patent No.: US 12,326,173 B2
(45) Date of Patent: Jun. 10, 2025

(54) ROLLING BEARING, ROTATING DEVICE, AND METHOD FOR MANUFACTURING ROLLING BEARING

(71) Applicant: Seiko Instruments Inc., Chiba (JP)

(72) Inventors: Akihiro Iino, Chiba (JP); Takayuki Kosaka, Chiba (JP); Keisuke Abo, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 64 days.

(21) Appl. No.: 18/324,013

(22) Filed: May 25, 2023

(65) Prior Publication Data
US 2023/0400061 A1    Dec. 14, 2023

(30) Foreign Application Priority Data

Jun. 8, 2022 (JP) .................................. 2022-092902
Apr. 27, 2023 (JP) .................................. 2023-073816

(51) Int. Cl.
*F16C 33/66* (2006.01)
*F16C 19/06* (2006.01)

(52) U.S. Cl.
CPC .......... *F16C 33/6696* (2013.01); *F16C 19/06* (2013.01); *F16C 2223/30* (2013.01); *F16C 2380/26* (2013.01)

(58) Field of Classification Search
None
See application file for complete search history.

(56) References Cited

U.S. PATENT DOCUMENTS

| 2,969,264 | A | * | 1/1961 | Lamson | .............. | F16C 33/6696 384/491 |
| 2,980,987 | A | * | 4/1961 | Lamson | .............. | F16C 33/6696 29/898.1 |
| 2017/0356500 | A1 | * | 12/2017 | Yamakawa | .......... | C09D 127/20 |

FOREIGN PATENT DOCUMENTS

| JP | 2004092721 A | * | 3/2004 | |
| JP | 2013-060990 | | 4/2013 | |
| JP | 2013060990 A | * | 4/2013 | ............ F16C 33/586 |

* cited by examiner

*Primary Examiner* — John Olszewski
*Assistant Examiner* — Aimee Tran Nguyen
(74) *Attorney, Agent, or Firm* — Crowell & Moring LLP

(57) ABSTRACT

To provide a rolling bearing and a rotating device which can reduce problems due to creep or the like, and a method for manufacturing a rolling bearing. A rolling bearing includes: an inner ring and an outer ring disposed coaxially with each other; and a rolling element disposed between the inner ring and the outer ring. A coating film is formed on at least one of an inner circumferential surface of the inner ring and an outer circumferential surface of the outer ring, and the coating film contains a mixture of calcium sulfonate and calcium carbonate or a compound obtained from calcium sulfonate and calcium carbonate.

8 Claims, 3 Drawing Sheets

ROLLING BEARING, ROTATING DEVICE, AND METHOD FOR MANUFACTURING ROLLING BEARING

RELATED APPLICATIONS

This application claims priority to Japanese Patent Application Nos. 2022-092902 filed on Jun. 8, 2022 and 2023-073816 filed Apr. 27, 2023, the entire content of which is incorporated herein by reference.

BACKGROUND OF THE INVENTION

1. Field of the Invention

The present invention relates to a rolling bearing, a rotating device, and a method for manufacturing a rolling bearing.

2. Description of the Related Art

A rolling bearing includes, for example, an outer ring and an inner ring coaxially disposed, a plurality of rolling elements disposed between the inner ring and the outer ring, and a retainer holding the rolling elements so as to be capable of rolling. This type of rolling bearing is used by being incorporated in a rotating device such as a fan motor. A ball bearing using balls as the rolling element is suitably used for a rotating device having a shaft portion of a rotating body rotating at high speed.

In recent years, there has been an increasing demand for a rotating device to rotate at high speed. When the rotating device rotates at high speed, a fixed ring of the inner ring and the outer ring of the rolling bearing may rotate and creep may occur. Fretting may also occur due to vibration movement of the fixed ring. The creep and the fretting may cause problems such as damage to the rolling bearing due to abrasion powder, abnormal heat generation, and rust formation.

As a countermeasure against problems due to creep or the like, it has been proposed to apply urea grease to a surface of the rolling bearing where friction is large to reduce the friction on the surface (for example, see JP-A-2013-60990).

SUMMARY OF THE INVENTION

However, in a rolling bearing to which a lubricant such as urea grease is applied, depletion of the lubricant or the like due to use for a long time may result in insufficient reduction of problems due to creep or the like.

An object of an aspect of the invention is to provide a rolling bearing and a rotating device which can reduce problems due to creep or the like, and a method for manufacturing a rolling bearing.

A rolling bearing according to an aspect of the invention includes: an inner ring and an outer ring disposed coaxially with each other; and a rolling element disposed between the inner ring and the outer ring, in which a coating film is formed on at least one of an inner circumferential surface of the inner ring and an outer circumferential surface of the outer ring, and the coating film contains a mixture of calcium sulfonate and calcium carbonate or a compound obtained from calcium sulfonate and calcium carbonate.

According to this configuration, the coating film is a hard film and has excellent frictional properties. Therefore, when creep or fretting occurs, adhesive wear due to metal contact can be reduced, and heat generation or occurrence of wear powder can be reduced. In particular, in a case where a contact counterpart is made of a material (steel, stainless steel, or the like) containing iron, when friction occurs with the contact counterpart, a film is formed on a sliding surface, and wear resistance and a rust-preventive effect are further improved. Since the coating film has a high rust-preventive effect, formation of rust can be reduced even in a high-temperature and high-humidity environment.

The coating film is preferably formed only on the inner circumferential surface of the inner ring in the inner circumferential surface and an outer circumferential surface of the inner ring.

According to this configuration, torque smoothness during an operation of the rolling bearing can be good and a noise can be reduced.

The coating film is preferably formed only on the outer circumferential surface of the outer ring in the outer circumferential surface and an inner circumferential surface of the outer ring.

According to this configuration, the torque smoothness during an operation of the rolling bearing can be good and a noise can be reduced.

The coating film may be formed on at least one of an end surface of the inner ring in an axial direction and an end surface of the outer ring in the axial direction.

According to this configuration, when the end surface abuts against another member, effects such as wear reduction and heat generation reduction are achieved.

The coating film preferably contains at least one of a calcium soap, a calcium complex soap, and a calcium salt.

According to this configuration, a rust prevention performance and a wear resistance performance are further improved.

The coating film preferably contains a base oil.

According to this configuration, lubricity of the coating film is further enhanced by the base oil.

A rust prevention layer may be formed on an entire surface of the inner ring and an entire surface of the outer ring, and the coating film may be formed on the rust prevention layer.

According to this configuration, a rust-preventive effect is obtained even in a region where the coating film is not formed.

The coating film preferably contains a solid lubricant.

According to this configuration, it is possible to reduce wear at a contact portion between the rolling bearing and a shaft portion or the like.

A rotating device according to an aspect of the invention includes: the rolling bearing; a rotating body having a shaft portion; and a base portion supporting the rotating body, in which the rolling bearing is mounted on the base portion and rotatably supports the shaft portion.

According to this configuration, the coating film is a hard film and has excellent frictional properties. Therefore, when creep or fretting occurs, adhesive wear due to metal contact can be reduced, and heat generation or occurrence of wear powder can be reduced. In particular, in a case where a contact counterpart is made of a material (steel, stainless steel, or the like) containing iron, when friction occurs with the contact counterpart, a film is formed on a sliding surface, and wear resistance and a rust-preventive effect are further improved. Since the coating film has a high rust-preventive effect, formation of rust can be reduced even in a high-temperature and high-humidity environment.

A rotating device according to an aspect of the invention includes: a rotating body having a shaft portion; a base portion supporting the rotating body; and a rolling bearing mounted on the base portion and rotatably supporting the shaft portion, in which the rolling bearing includes an inner ring and an outer ring disposed coaxially with each other, and a rolling element disposed between the inner ring and the outer ring, and a coating film is formed on at least one of a region of an outer circumferential surface of the shaft portion with which the rolling bearing is in contact and a region of an inner circumferential surface of the base portion with which the rolling bearing is in contact, the coating film containing a mixture of calcium sulfonate and calcium carbonate or a compound obtained from calcium sulfonate and calcium carbonate.

According to this configuration, when creep or fretting occurs, adhesive wear due to metal contact can be reduced, and heat generation or occurrence of wear powder can be reduced. Formation of rust can be reduced even in a high-temperature and high-humidity environment.

A method for manufacturing a rolling bearing according to an aspect of the invention is a method for manufacturing a rolling bearing in which a rolling element is disposed between an inner ring and an outer ring disposed coaxially with each other. The method for manufacturing a rolling bearing includes: a step of forming a coating film by applying, to at least one of an inner circumferential surface of the inner ring and an outer circumferential surface of the outer ring, a grease composition containing a mixture of calcium sulfonate and calcium carbonate or containing a compound obtained from calcium sulfonate and calcium carbonate, in which in the step of forming a coating film, the coating film is formed by using an application member to rub the grease composition against at least one of the inner circumferential surface of the inner ring and the outer circumferential surface of the outer ring.

According to this method, bonding strength of the coating film to at least one of the inner circumferential surface of the inner ring and the outer circumferential surface of the outer ring can be increased.

According to the aspect of the invention, it is possible to provide the rolling bearing and the rotating device which can reduce problems due to creep or the like.

DETAILED DESCRIPTION OF THE PREFERRED EMBODIMENTS

Embodiments of the invention will be described below with reference to the drawings. In the following description, configurations having the same or similar functions are denoted by the same reference signs. Repeated description for these configurations may be omitted.

Figure 1:
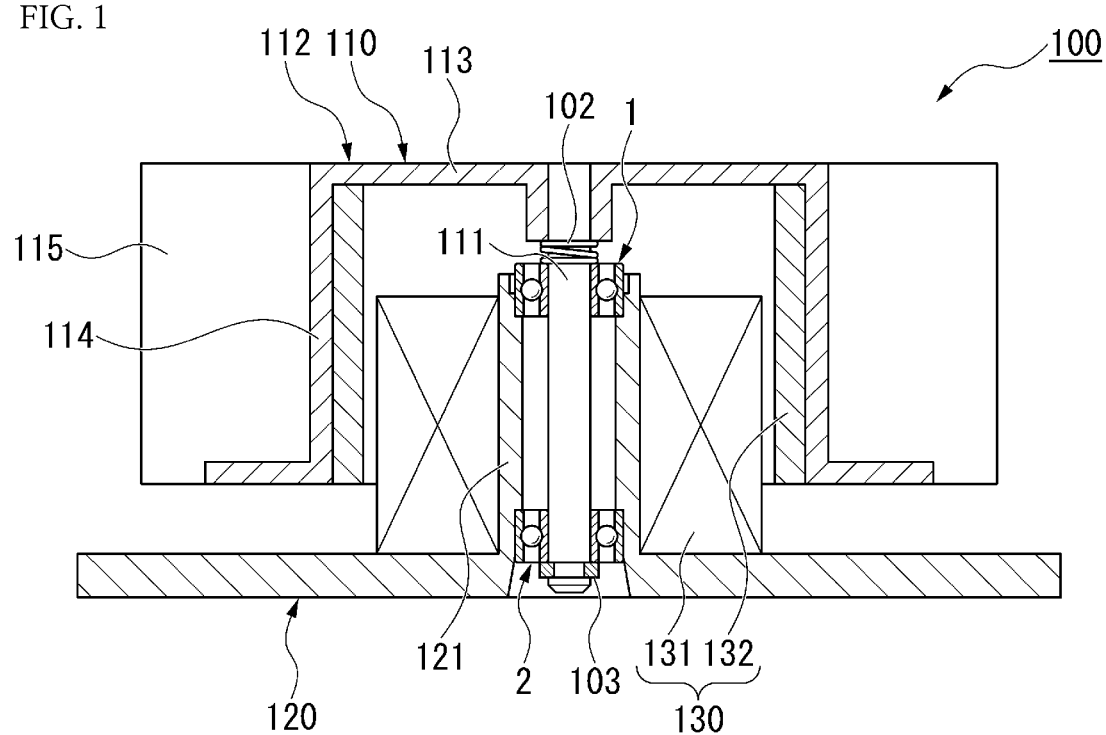
FIG. 1 is a longitudinal sectional view showing a fan motor according to an embodiment.

FIG. 1 is a longitudinal sectional view showing a fan motor according to an embodiment.

A fan motor 100 shown in FIG. 1 is an example of a rotating device. The fan motor 100 includes a rotating body 110, a base portion 120, a drive unit 130, a first rolling bearing 1, and a second rolling bearing 2. The rotating body 110 includes a shaft portion 111. The base portion 120 supports the rotating body 110. The drive unit 130 rotates the rotating body 110 with respect to the base portion 120. The drive unit 130, the first rolling bearing 1, and the second rolling bearing 2 are mounted on the base portion 120. The first rolling bearing 1 and the second rolling bearing 2 rotatably support the shaft portion 111. The first rolling bearing 1 and the second rolling bearing 2 are examples of a "rolling bearing".

In the following description, the rolling bearing may be simply referred to as a bearing. In the present embodiment, a direction in which a central axis O of the shaft portion 111 of the rotating body 110 extends is referred to as an axial direction. A direction orthogonal to the central axis O and extending radially from the central axis O is referred to as a radial direction. A direction around the central axis O is referred to as a circumferential direction. One of directions parallel to the axial direction and oriented in opposite directions is defined as upward (first direction). The other of the directions parallel to the axial direction and oriented in the opposite directions is defined as downward (second direction).

The base portion 120 includes a tubular portion 121 extending in the axial direction. The shaft portion 111 of the rotating body 110 is inserted into the tubular portion 121. The tubular portion 121 is made of a metal, for example. The tubular portion 121 is preferably made of a metal (steel, stainless steel, or the like) containing iron. A constituent material for the tubular portion 121 is not particularly limited. The tubular portion 121 may be made of, for example, a metal (such as brass) which does not contain iron or a resin.

The rotating body 110 is disposed above the base portion 120. The rotating body 110 includes the shaft portion 111 and a fan 112. The shaft portion 111 is made of a metal, for example. The shaft portion 111 is preferably made of a metal (steel, stainless steel, or the like) containing iron. A constituent material for the shaft portion 111 is not particularly limited. The shaft portion 111 may be made of, for example, a metal (such as brass) which does not contain iron or a resin.

The fan 112 is coupled to the shaft portion 111 outside the tubular portion 121. The fan 112 is fixed to an upper end portion of the shaft portion 111.

The fan 112 includes a flange 113, a circumferential wall portion 114, and a plurality of blades 115. The flange 113 protrudes outward in the radial direction from the upper end portion of the shaft portion 111. The flange 113 is formed over an entire shaft portion 111 in the circumferential direction. The circumferential wall portion 114 extends downward from an entire outer circumferential edge of the flange 113. The circumferential wall portion 114 surrounds the tubular portion 121 over an entire circumference of the tubular portion 121 at a distance from the tubular portion 121 in the radial direction. The plurality of blades 115 are arranged at intervals in the circumferential direction outside the circumferential wall portion 114 in the radial direction.

The drive unit 130 is a motor. The drive unit 130 includes a stator 131 having a coil and a rotor 132 having a magnet. The stator 131 is fixed to the base portion 120 outside the shaft portion 111. The rotor 132 is fixed to the circumferential wall portion 114 of the fan 112 outside the stator 131 in the radial direction.

The first bearing 1 and the second bearing 2 are interposed between an inner circumferential surface of the tubular portion 121 and an outer circumferential surface of the shaft portion 111. The first bearing 1 and the second bearing 2 are ball bearings. The first bearing 1 and the second bearing 2 are disposed coaxially with each other. The first bearing 1 and the second bearing 2 are disposed at an interval in the axial direction. The first bearing 1 is disposed closer to a center of gravity of the rotating body 110 than the second bearing 2. The first bearing 1 is disposed above the second bearing 2.

The first bearing 1 is inserted into the tubular portion 121 from above. A lower end portion of the first bearing 1 is restricted from being displaced downward by a step on the inner circumferential surface of the tubular portion 121. The first bearing 1 is in contact with a biasing member 102. The biasing member 102 is a coil spring. The biasing member 102 is externally fitted on the shaft portion 111 of the rotating body 110 and is disposed coaxially with the central axis O.

The biasing member 102 is interposed in a compressed state between the first bearing 1 and the flange 113 of the fan 112. An upper end portion of the biasing member 102 is in contact with the flange 113 from below. A lower end portion of the biasing member 102 is in contact with an inner ring of the first bearing 1 from above. Accordingly, the biasing member 102 biases the first bearing 1 downward with respect to the rotating body 110.

The second bearing 2 is inserted into the tubular portion 121 from below. An outer ring of the second bearing 2 is restricted from being displaced upward by a step on the inner circumferential surface of the tubular portion 121. An inner ring of the second bearing 2 is in contact with a C-ring 103 mounted on a lower end portion of the shaft portion 111 from above. Accordingly, downward of the second bearing 2 with respect to the shaft portion 111 is restricted.

First Embodiment

Figure 2:
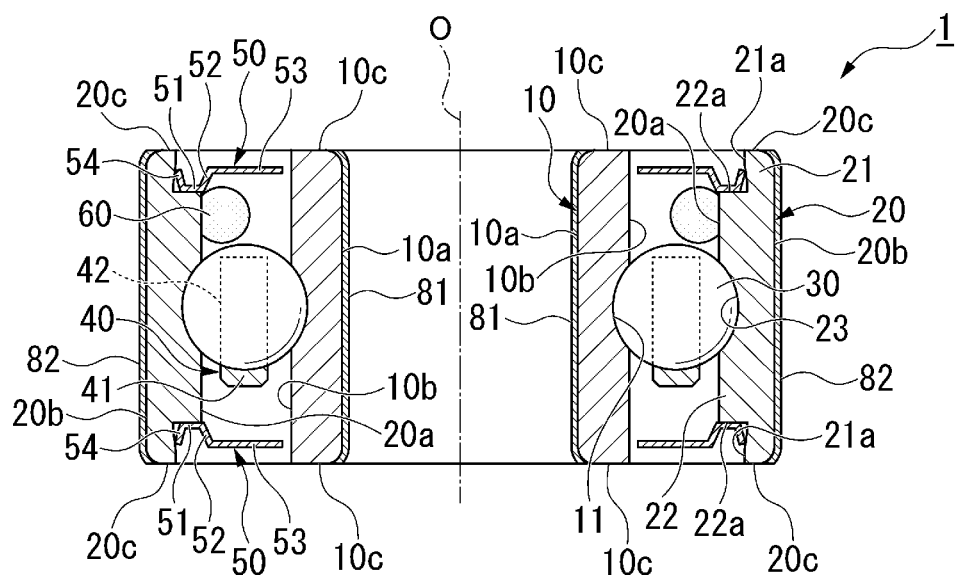
FIG. 2 is a longitudinal sectional view of a first rolling bearing according to a first embodiment.

FIG. 2 is a longitudinal sectional view of the first rolling bearing according to a first embodiment.

As shown in FIG. 2, the first bearing 1 includes an inner ring 10 and an outer ring 20 which are bearing rings, a plurality of rolling elements 30, a retainer 40, and a pair of seal members 50. The inner ring 10 and the outer ring 20 have the central axis O as a common axis. The second bearing 2 (see FIG. 1) has the same configuration as the first bearing 1.

The inner ring 10 is provided as a rotating ring. The inner ring 10 is externally fitted to the shaft portion 111. The outer ring 20 is provided as a fixed ring. The outer ring 20 surrounds the inner ring 10 from an outer side in the radial direction in a state where an annular space is provided between the outer ring 20 and the inner ring 10. The plurality of rolling elements 30 are arranged between the inner ring 10 and the outer ring 20, and are held by the retainer 40 so as to be capable of rolling. The retainer 40 holds the plurality of rolling elements 30 rotatable in a state where the rolling elements 30 are evenly arranged in the circumferential direction. Each of the seal members 50 covers the annular space between the inner ring 10 and the outer ring 20 from an outside in the axial direction.

The outer ring 20 is made of a metal material such as stainless steel or bearing steel and has a circular ring shape. The outer ring 20 is not limited to being made of a metal, and may be made of another material.

The outer ring 20 has an outer ring body 21 and a protruding portion 22. A width (dimension in the axial direction) of the outer ring body 21 is equal to a width (dimension in the axial direction) of the inner ring 10. The protruding portion 22 protrudes inward in the radial direction from an inner circumferential surface of the outer ring body 21. The protruding portion 22 is formed over an entire outer ring body 21 in the circumferential direction. The protruding portion 22 is formed in a portion including a center of the outer ring body 21 in the axial direction. A width (dimension in the axial direction) of the protruding portion 22 is smaller than the width (dimension in the axial direction) of the outer ring body 21. The width (dimension in the axial direction) of the protruding portion 22 is larger than an outer diameter of each of the rolling elements 30.

An outer ring raceway surface 23 recessed outward in the radial direction is formed on an inner circumferential surface of the protruding portion 22. The outer ring raceway surface 23 has an arc shape in a cross-sectional view along an outer surface of the rolling element 30. The outer ring raceway surface 23 is formed in an annular shape extending in the circumferential direction over an entire circumference of the inner circumferential surface of the protruding portion 22. The outer ring raceway surface 23 is formed in a portion including a center in the inner circumferential surface of the protruding portion 22 in the axial direction. An inner diameter of a portion of the inner circumferential surface of the protruding portion 22 excluding the outer ring raceway surface 23 is constant. The protruding portion 22 has a pair of end surfaces 22a facing each other in the axial direction. Each of the end surfaces 22a is formed by a difference in an inner diameter between the protruding portion 22 and the outer ring body 21. The end surfaces 22a are surfaces parallel to each other in both the radial direction and the circumferential direction.

The outer ring body 21 has a pair of inner circumferential surfaces 21a each extending from an outer circumferential edge of each end surface 22a of the protruding portion 22 to an opening edge of the outer ring 20.

The inner ring 10 is made of a metal material such as stainless steel or bearing steel and has a circular ring shape. The inner ring 10 is not limited to being made of a metal, and may be made of another material.

An inner ring raceway surface 11 recessed inward in the radial direction is formed on an outer circumferential surface of the inner ring 10. The inner ring raceway surface 11 has an arc shape in a cross-sectional view along the outer surface of the rolling element 30. The inner ring raceway surface 11 is formed in an annular shape extending in the circumferential direction over an entire circumference of the outer circumferential surface of the inner ring 10. The inner ring raceway surface 11 is formed in a portion including a center in the outer circumferential surface of the inner ring 10 in the axial direction. The inner ring raceway surface 11 faces the outer ring raceway surface 23 in the radial direction. An outer diameter of the outer circumferential surface of the inner ring 10 excluding the inner ring raceway surface 11 is constant.

The plurality of rolling elements 30 are formed in a spherical shape. Examples of a constituent material for the rolling element 30 include metals (stainless steel, bearing steel, or the like) and ceramics (zirconia or the like). The rolling element 30 is disposed between the outer ring raceway surface 23 and the inner ring raceway surface 11. The rolling element 30 is rotatably supported by the outer ring raceway surface 23 and the inner ring raceway surface 11. The plurality of rolling elements 30 are kept at intervals in the circumferential direction by the retainer 40.

The retainer 40 is made of a synthetic resin or a metal material and has a circular ring shape as a whole. The retainer 40 is disposed coaxially with the central axis O. The retainer 40 includes an annular portion 41 and a plurality of column portions 42. The annular portion 41 is formed in a circular ring shape. The annular portion 41 is disposed below the plurality of rolling elements 30. Each of the column portions 42 protrudes upward from the annular portion 41. The plurality of column portions 42 are provided at intervals in the circumferential direction. The column portions 42 are arranged evenly in the circumferential direction. A pair of column portions 42 adjacent to each other in the circumferential direction form a ball pocket therebetween. The ball pocket passes through the retainer 40 in the radial direction. The ball pocket opens upward in an upper end surface of the retainer 40. Ball pockets are provided corresponding to the number of the rolling elements 30, and hold the rolling elements 30 individually in a rollable manner. Accordingly, the retainer 40 arranges the rolling elements 30 evenly at intervals in the circumferential direction.

The seal member 50 is formed in a circular plate shape. The seal member 50 is disposed coaxially with the central axis O. The seal member 50 is mounted on the outer ring 20. The seal member 50 is disposed on each side of the plurality of rolling elements 30 in the axial direction. The seal member 50 includes a pedestal portion 51, a step portion 52, a cover portion 53, and a locking portion 54. The pedestal portion 51 overlaps the end surface 22a of the protruding portion 22 of the outer ring 20 from the outside in the axial direction. The step portion 52 extends outward in the axial direction from an inner circumferential edge of the pedestal portion 51. The cover portion 53 protrudes inward in the radial direction from an outer end edge of the step portion 52 in the axial direction. The locking portion 54 extends outward in the radial direction and in the axial direction from an outer circumferential edge of the pedestal portion 51.

The seal member 50 extends in the radial direction across at least a center of the rolling element 30 in a plan view. In the present embodiment, the cover portion 53 overlaps the center of the rolling element 30 in the plan view. The step portion 52 may extend outward in the axial direction and inward in the radial direction from the inner circumferential edge of the pedestal portion 51 and overlap the center of the rolling element 30 in the plan view. An inner circumferential edge of the cover portion 53 is disposed with a gap from the outer circumferential surface of the inner ring 10. The outer circumferential edge of the locking portion 54 is locked to each of the inner circumferential surfaces 21a of the outer ring body 21 from an inside in the axial direction. Accordingly, the seal member 50 is fixed to the outer ring 20.

The first bearing 1 has grease 60. The grease 60 contains a base oil and a thickener. The thickener is preferably a urea compound from a viewpoint of excellent heat resistance. The grease 60 is disposed in an annular space between the inner ring 10 and the outer ring 20. An application amount and an application position of the grease 60 are not particularly limited. The grease 60 is in contact with, for example, the inner circumferential surface 20a of the outer ring 20 over an entire circumference. The grease 60 may be in contact with the outer circumferential surface 10b of the inner ring 10. The grease 60 may be disposed only on one side of the rolling element 30 in the axial direction, or may be disposed on both sides in the axial direction. The grease 60 may be applied to the rolling element 30. The grease 60 may cover the entire region of the inner circumferential surface of the outer ring 20, the outer circumferential surface of the inner ring 10, and a surface of the rolling element 30.

A coating film 81 is formed on the inner circumferential surface 10a of the inner ring 10 of the first bearing 1. The coating film 81 may be formed on at least a part of the inner circumferential surface 10a of the inner ring 10, but the coating film 81 is preferably formed on the entire region of the inner circumferential surface 10a of the inner ring 10. The coating film 81 is not formed on the outer circumferential surface 10b of the inner ring 10. That is, the coating film 81 is formed only on the inner circumferential surface 10a in the inner circumferential surface 10a and the outer circumferential surface 10b.

In the present embodiment, the coating film 81 is not formed on both end surfaces 10c of the inner ring 10 in the axial direction. That is, the coating film 81 is formed only on the inner circumferential surface 10a among the inner circumferential surface 10a, the outer circumferential surface 10b, and the end surfaces 10c.

A coating film 82 is formed on the outer circumferential surface 20b of the outer ring 20. The coating film 82 may be formed on at least a part of the outer circumferential surface 20b of the outer ring 20, but the coating film 82 is preferably formed on the entire region of the outer circumferential surface 20b of the outer ring 20. The coating film 82 is not formed on the inner circumferential surface 20a of the outer ring 20. That is, the coating film 82 is formed only on the outer circumferential surface 20b in the inner circumferential surface 20a and the outer circumferential surface 20b.

In the present embodiment, the coating film 82 is not formed on both end surfaces 20c of the outer ring 20 in the axial direction. That is, the coating film 82 is formed only on the outer circumferential surface 20b among the inner circumferential surface 20a, the outer circumferential surface 20b, and the end surfaces 20c.

The coating film 81 is formed only on the inner circumferential surface 10a in the inner circumferential surface 10a and the outer circumferential surface 10b. The coating film 82 is formed only on the outer circumferential surface 20b in the inner circumferential surface 20a and the outer circumferential surface 20b. Since the coating films 81 and 82 are formed thus, torque smoothness (a property of uniform torque during rotation) when the rotating body 110 (see FIG. 1) rotates (that is, during an operation of the first bearing 1) is good. It is also possible to reduce a noise when the rotating body 110 rotates.

A reason why the torque smoothness and noise properties are good by forming the coating films 81 and 82 as described above can be presumed as follows. A calcium compound in the coating films 81 and 82 may form hard particles. Therefore, the coating films 81 and 82 may be in a surface state having rough irregularities due to the hard particles. When coarse surface roughness comes into contact with the rolling element 30, it is considered that a decrease in the torque smoothness and an increase in a noise occur when the rotating body 110 (see FIG. 1) rotates.

In this regard, the coating film 81 is formed only on the inner circumferential surface 10a in the inner circumferential surface 10a and the outer circumferential surface 10b. The coating film 82 is formed only on the outer circumferential surface 20b in the inner circumferential surface 20a and the outer circumferential surface 20b. Therefore, even if the coating films 81 and 82 are formed with coarse surface roughness, the surface roughness do not come into contact with the rolling element 30. Accordingly, the torque smoothness when the rotating body 110 (see FIG. 1) rotates is good. It is also possible to reduce a noise when the rotating body 110 rotates.

Although there is no coating film on the outer circumferential surface 10b of the inner ring 10 and the inner circumferential surface 20a of the outer ring 20, the grease 60 is filled between the inner ring 10 and the outer ring 20, so that the outer circumferential surface 10b and the inner circumferential surface 20a have good rust prevention properties.

The coating films 81 and 82 contain a mixture of calcium sulfonate and calcium carbonate or a compound obtained from calcium sulfonate and calcium carbonate. "A mixture of calcium sulfonate and calcium carbonate or a compound obtained from calcium sulfonate and calcium carbonate" is abbreviated as "calcium sulfonate composition". The calcium sulfonate composition is also referred to as a calcium sulfonate complex.

Calcium sulfonate is, for example, represented by the following general formula (1):

$$[R_1\text{—}SO_3]_2Ca \tag{1}$$

"$R_1$" is preferably an alkyl group, an alkenyl group, an alkylnaphthyl group, a dialkylnaphthyl group, an alkylphenyl group, a petroleum high-boiling fraction residue, or the like. "$R_1$" preferably has 6 or more and 28 or less carbon atoms. "$R_1$" is, for example, an alkyl group having 6 or more and 28 or less carbon atoms or an alkylphenyl group having 7 or more and 28 or less carbon atoms.

Examples of the calcium sulfonate include calcium salts of alkyl aromatic sulfonic acids such as dodecylbenzenesulfonic acid, octadecylbenzenesulfonic acid, dilaurylcetylbenzenesulfonic acid, dinonylnaphthalenesulfonic acid, paraffin wax-substituted benzene sulfonic acids, polyolefin-substituted benzene sulfonic acids, and polyisobutylene-substituted benzene sulfonic acids; calcium salts of aromatic sulfonic acids; calcium salts of alkyl sulfonic acids; and calcium salts of petroleum sulfonic acids.

The calcium sulfonate composition is preferably a compound represented by the following general formula (2):

$$[R_2\text{—}SO_3]_2Ca\cdot n CaCO_3 \tag{2}$$

("$R_2$" is an alkyl group having 6 or more and 28 or less carbon atoms or an alkylphenyl group having 7 or more and 28 or less carbon atoms. "n" is an integer of 6 or more and 50 or less.)

"$R_2$" may be, for example, a linear or branched alkyl group having 6 or more and 28 or less carbon atoms. "$R_2$" may be, for example, an alkylphenyl group having 7 or more and 28 or less carbon atoms in which a linear alkyl group and a phenyl group are bonded. "$R_2$" may be, for example, an alkylphenyl group having 7 or more and 28 or less carbon atoms in which a branched alkyl group and a phenyl group are bonded. Among these examples, an alkylphenyl group, in particular, an alkylphenyl group in which a linear alkyl group and a phenyl group are bonded, is preferable. The alkylphenyl group preferably has 12 or more and 24 or less carbon atoms, and particularly preferably has 12, 14, 18, or 20 carbon atoms. A position to which the alkyl group is bonded in the alkylphenyl group is preferably a para position of the phenyl group.

It is considered that the calcium sulfonate composition has a structure in which calcium carbonate is disposed in an aggregate (micelle) formed by calcium sulfonate molecules.

The coating films 81 and 82 may contain at least one of a calcium soap, a calcium complex soap, and a calcium salt in addition to the calcium sulfonate composition. One of the calcium soap, the calcium complex soap, and the calcium salt may be used, or two or more thereof may be used in combination.

The calcium soap is a calcium salt of carboxylic acid (for example, fatty acid). The carboxylic acid may have, for example, 10 or more and 36 or less carbon atoms. Examples of the carboxylic acid include long chain fatty acids such as a stearic acid, a lauric acid, a myristic acid, a palmitic acid, an oleic acid, and a behenic acid. Specific examples of the calcium soap include bis(behenic acid) calcium salt, bis (stearic acid)calcium salt, and bis(12-hydroxystearic acid) calcium salt. These examples may be used alone or in combination of two or more.

The calcium complex soap is a calcium salt of a carboxylic acid. The term "complex" means that a plurality of carboxylic acids are used. As the carboxylic acid, a long chain fatty acid or a short chain fatty acid may be used. As the calcium complex soap, for example, a long chain fatty acid having 12 or more (for example, 12 or more and 24 or less) carbon atoms and a short chain fatty acid having 10 or less (for example, 2 or more and 6 or less) carbon atoms can be used. Examples of the long chain fatty acid include, but are not limited to, a stearic acid, a lauric acid, a myristic acid, a palmitic acid, an oleic acid, and a behenic acid. Examples of the short chain fatty acid include an acetic acid, a propionic acid, and a butyric acid. Specific examples of the calcium complex soap include a complex soap of calcium stearate and calcium acetate.

The calcium salt is a compound in which a hydrogen atom of an acid is substituted with a calcium ion. Specific examples of the calcium salt include calcium acetate, calcium borate, and calcium phosphate. These examples may be used alone or in combination of two or more.

When the calcium sulfonate composition contains at least one of a calcium soap, a calcium complex soap, and a calcium salt, thickening ability, a dropping point, wear resistance, extreme pressure properties, and the like can be adjusted. Accordingly, a function of the calcium sulfonate composition as a thickener can be enhanced.

The calcium sulfonate composition is preferably mixed with the base oil. Accordingly, the coating films 81 and 82 contain the base oil.

Examples of the base oil include a mineral oil, a synthetic oil, and a mixed oil thereof. The base oil may contain fatty oils and other fats as long as lubricity is not impaired.

Examples of the synthetic oil include a hydrocarbon-based synthetic oil, an ester-based synthetic oil, a phenyl ether-based synthetic oil, a glycol-based synthetic oil, a silicone-based synthetic oil, and a fluorine-based synthetic oil. As the synthetic oil, one of these oils may be used, or a mixed oil of two or more of these oils may be used. Among the oils, a hydrocarbon-based synthetic oil is particularly preferable.

Examples of the hydrocarbon-based synthetic oil include poly-α-olefin (PAO), ethylene-α-olefin copolymer, polybutene, alkylbenzene, and alkylnaphthalene. Among these examples, poly-α-olefin is particularly preferable.

Examples of monomers forming the poly-α-olefin include α-olefins having 3 or more and 22 or less carbon atoms, that is, propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-icosene, 1-eicosene, and 1-docosene. Among these examples, an α-olefin having 6 or more and 18 or less carbon atoms, for example, 1-decene is particularly preferable.

Examples of the poly-α-olefin include a dimer to a heptamer of an α-olefin. For example, a dimer, a trimer, or a tetramer of an α-olefin is preferable.

The hydrocarbon-based synthetic oil may be mixed with an ester-based synthetic oil, a phenyl ether-based synthetic oil, or the like as long as lubricity is not impaired.

Examples of the mineral oil include a naphthenic mineral oil, a paraffinic mineral oil, and a mixed oil thereof.

A kinematic viscosity and a pour point of the base oil are not particularly limited. The kinematic viscosity of the base oil at 40° C. may be, for example, 15 mm$^2$/s or more and 80 mm$^2$/s or less. The "kinematic viscosity at 40° C." can be measured by a method specified in "5. kinematic viscosity test method" of "JIS K2283:2000". The pour point of the base oil is preferably −30° C. or lower, and more preferably −40° C. or lower.

A proportion of the base oil in the coating films 81 and 82 may be 40 mass % or more and 90 mass % or less. A proportion of the calcium sulfonate composition in the coating films 81 and 82 may be 10 mass % or more and 60 mass % or less.

To the calcium sulfonate composition, an additive such as an antioxidant, a corrosion inhibitor, a rust-preventive agent, an extreme pressure agent, a solid lubricant, an antiwear additive, a thickener, an oily agent, an antiwear agent, a structural stabilizer, a colorant, a cleaning dispersant, a hue stabilizer, a metal deactivator, a viscosity index improver, a pour point depressant, and a surfactant may be added. The additive can be added to, for example, a grease composition containing a calcium sulfonate composition and a base oil. Accordingly, the additive is in the coating films 81 and 82.

Examples of the solid lubricant include one or more of molybdenum disulfide, graphite, and polytetrafluoroethylene (PTFE). When the solid lubricant is used, even when the inner ring 10 rotates while receiving a large load on the shaft portion 111 (see FIG. 1), it is possible to further reduce wear at a contact portion between the shaft portion 111 and the inner ring 10. When the solid lubricant is used, even when the outer ring 20 rotates while receiving a large load on the tubular portion 121 (see FIG. 1), it is possible to further reduce wear at a contact portion between the tubular portion 121 and the outer ring 20.

In the first bearing 1 and the second bearing 2, the coating films 81 and 82 are formed on both the inner circumferential surface 10a of the inner ring 10 and the outer circumferential surface 20b of the outer ring 20, but the coating film may be formed on at least one of the inner circumferential surface 10a of the inner ring 10 and the outer circumferential surface 20b of the outer ring 20. For example, the coating film may be formed on only one of the inner circumferential surface 10a and the outer circumferential surface 20b.

As shown in FIG. 1, the first bearing 1 and the second bearing 2 are interposed between the inner circumferential surface of the tubular portion 121 and the outer circumferential surface of the shaft portion 111. The inner circumferential surface of the tubular portion 121 and the outer circumferential surface of the shaft portion 111 are contact counterparts for the coating film.

When both the inner circumferential surface of the tubular portion 121 and the outer circumferential surface of the shaft portion 111 are made of a metal (steel, stainless steel, or the like) containing iron, the coating film may be formed on both the inner circumferential surface 10a of the inner ring 10 and the outer circumferential surface 20b of the outer ring 20. However, when one of the inner circumferential surface of the tubular portion 121 and the outer circumferential surface of the shaft portion 111 is not made of a metal containing iron, the coating film may not be formed on a circumferential surface (the inner circumferential surface 10a or the outer circumferential surface 20b) facing a contact counterpart.

According to this configuration, it is possible to prevent the contact counterpart (the inner circumferential surface of the tubular portion 121 or the outer circumferential surface of the shaft portion 111) made of a material other than a metal containing iron from being worn by the coating film. A reason why the wear of the contact counterpart can be reduced is that, since there is no coating film facing the contact counterpart, even if surface roughness is formed in the coating film, the surface roughness does not come into contact with the contact counterpart. When the contact counterpart is made of a material other than a metal containing iron, the adhesive wear hardly occurs.

The coating films 81 and 82 can be formed by, for example, applying a grease composition containing a calcium sulfonate composition and a base oil to the inner circumferential surface 10a of the inner ring 10 and the outer circumferential surface 20b of the outer ring 20. In the grease composition, the calcium sulfonate composition functions as a thickener.

When applying the grease composition to the inner circumferential surface 10a and the outer circumferential surface 20b, it is desirable to use a soft application member such as cloth or paper to rub the grease composition against the inner circumferential surface 10a and the outer circumferential surface 20b. By applying the grease composition to the inner circumferential surface 10a and the outer circumferential surface 20b by rubbing, bonding strength of the coating films 81 and 82 to the inner circumferential surface 10a and the outer circumferential surface 20b can be increased. By applying the grease composition to the inner circumferential surface 10a and the outer circumferential surface 20b by rubbing, the hard coating films 81 and 82 can be reliably formed.

The grease composition may contain not only the calcium sulfonate composition but also other thickener components. As a thickener component, a commonly used thickener can be used. Examples of the thickener component include a metal soap and a non-soap. Examples of the metal soap include one or more of a lithium soap, a lithium complex soap, an aluminum soap, and an aluminum complex soap. Examples of the non-soap include one or more of a urea compound, polytetrafluoroethylene (PTFE), organized bentonite, and a silica gel.

A total addition amount of the thickener component (thickener other than the calcium sulfonate composition) and the additive may be, for example, 30 mass % or less in the grease composition (containing no diluent oil). The total addition amount of the thickener component and the additive can be set to 0.1 mass % or more in the grease composition (containing no diluent oil).

An addition amount of the additive may be 0.1 mass % or more in the grease composition (containing no diluent oil). The addition amount of the additive may be 10 mass % or less in the grease composition (containing no diluent oil).

The calcium sulfonate composition may be separately synthesized and dispersed in the base oil. The calcium sulfonate composition may be dispersed in the base oil by being synthesized in the base oil.

A diluent oil may be added to the grease composition. The diluent oil has a lower viscosity than the base oil. Examples of the diluent oil include hexane. When the diluent oil is used, a viscosity of the grease composition can be reduced, so that work of forming the coating films 81 and 82 by applying the grease composition can be facilitated. The diluent oil may be a mineral oil, a synthetic oil, a mixed oil thereof, or the like. The calcium sulfonate composition in the grease composition may be dispersed in the diluent oil.

When the diluent oil is added to the grease composition, the diluent oil evaporates after the grease composition is applied, but the other components (base oil and the like) remain in applied portions to form the coating films 81 and 82. The base oil having a high viscosity is less likely to evaporate and has high heat resistance. Therefore, when the base oil having a high viscosity is used, even if the inner ring 10 and the outer ring 20 rotate with respect to the shaft portion 111 and the tubular portion 121, good lubrication properties are easily obtained. In order to obtain good properties, the kinematic viscosity of the base oil at 40° C. may be 80 mm$^2$/s or more. In view of ease of application of the grease composition, the kinematic viscosity of the base oil at 40° C. is preferably 40 mm$^2$/s or more and 150 mm$^2$/s or less.

An example of a method for manufacturing the first bearing 1 will be described.

First Step: Assembly of Bearing

The first bearing 1 including the inner ring 10, the outer ring 20, the rolling elements 30, the retainer 40, and the seal member 50 is assembled (see FIG. 2).

Second Step: Formation of Coating Film

The grease composition is applied to the inner circumferential surface 10a of the inner ring 10 and the outer circumferential surface 20b of the outer ring 20. At this time, for example, it is desirable to use a soft application member such as cloth or paper to rub the grease composition against the inner circumferential surface 10a and the outer circumferential surface 20b. The application member may be a member softer than a surface to be applied (the inner circumferential surface 10a and the outer circumferential surface 20b). The coating films 81 and 82 can be formed by drying the diluent oil in a coating film of the grease composition.

By applying the grease composition to the inner circumferential surface 10a and the outer circumferential surface 20b by rubbing, the bonding strength of the coating films 81 and 82 to the inner circumferential surface 10a and the outer circumferential surface 20b can be increased. By applying the grease composition to the inner circumferential surface 10a and the outer circumferential surface 20b by rubbing, the hard coating films 81 and 82 can be reliably formed.

The second bearing 2 can be manufactured in a similar manner as the first bearing 1.

The fan motor 100 shown in FIG. 1 can be assembled by assembling, to the shaft portion 111 and the tubular portion 121, the bearings 1 and 2 on which the coating films 81 and 82 are formed in advance.

In the first bearing 1 and the second bearing 2 of the present embodiment, the coating films 81 and 82 are formed. Since the coating films 81 and 82 are hard films and have excellent frictional properties, it is possible to reduce friction and reduce a phenomenon caused by creep or fretting. For example, adhesive wear due to metal contact can be reduced, and heat generation or occurrence of wear powder can be reduced. In particular, in a case where a contact counterpart for the first bearing 1 and the second bearing 2 (the inner circumferential surface of the tubular portion 121, the outer circumferential surface of the shaft portion 111, the biasing member 102, and the like) is made of a material (steel, stainless steel, or the like) containing iron, when friction occurs with the contact counterpart, a film is formed on a sliding surface, and wear resistance and a rust-preventive effect are further improved.

Since the coating films 81 and 82 have a high rust-preventive effect, formation of rust on the first bearing 1, the second bearing 2, the tubular portion 121, the shaft portion 111 (see FIG. 1), and the like can be reduced even in a high-temperature and high-humidity environment.

When the coating films 81 and 82 contain at least one of a calcium soap, a calcium complex soap, and a calcium salt, a rust prevention performance and a wear resistance performance are further improved.

In the case where the coating films 81 and 82 contain the base oil, when the coating films 81 and 82 are formed by application of the grease composition, the grease composition is likely to remain in an application portion, which facilitates formation of the coating films. When the coating films 81 and 82 contain the base oil, lubricity of the coating films 81 and 82 is further enhanced by the base oil.

In the fan motor 100 according to the present embodiment, since the coating films 81 and 82 are formed on the first bearing 1 and the second bearing 2, it is possible to reduce friction of the first bearing 1 and the second bearing 2 and to reduce a phenomenon caused by creep or fretting. For example, adhesive wear due to metal contact can be reduced, and heat generation or occurrence of wear powder can be reduced. Formation of rust can be reduced even in a high-temperature and high-humidity environment.

Second Embodiment

Figure 3:
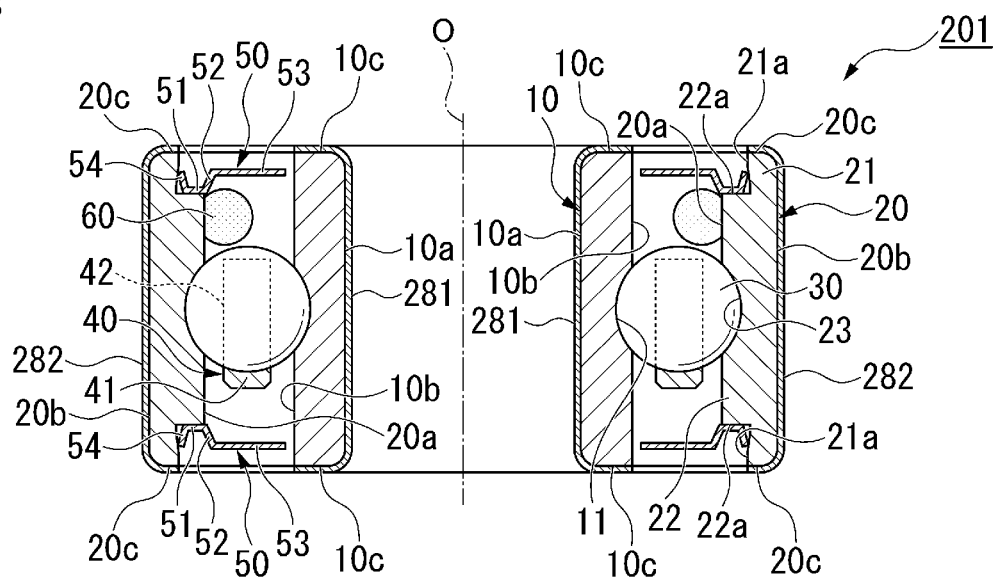
FIG. 3 is a longitudinal sectional view of a first rolling bearing according to a second embodiment.

FIG. 3 is a longitudinal sectional view of a first rolling bearing according to a second embodiment.

As shown in FIG. 3, a coating film 281 is formed on the inner circumferential surface 10a and the end surfaces 10c of the inner ring 10 of a first bearing 201. The coating film 281 is not formed on the outer circumferential surface 10b of the inner ring 10. That is, the coating film 281 is formed only on the inner circumferential surface 10a and the end surfaces 10c among the inner circumferential surface 10a, the outer circumferential surface 10b, and the end surfaces 10c. The coating film 281 is continuously formed from the inner circumferential surface 10a to the end surfaces 10c.

The coating film 281 may be formed on at least a part of the end surfaces 10c of the inner ring 10, but the coating film 281 is preferably formed on the entire region of the end surfaces 10c.

A coating film 282 is formed on the outer circumferential surface 20b and the end surfaces 20c of the outer ring 20 of the first bearing 201. The coating film 282 is not formed on the inner circumferential surface 20a of the outer ring 20. That is, the coating film 282 is formed only on the outer circumferential surface 20b and the end surfaces 20c among the inner circumferential surface 20a, the outer circumferential surface 20b, and the end surfaces 20c. The coating film 282 is continuously formed from the outer circumferential surface 20b to the end surfaces 20c.

The coating film 282 may be formed on at least a part of the end surfaces 20c of the outer ring 20, but the coating film 282 is preferably formed on the entire region of the end surfaces 20c.

The coating films 281 and 282 have the same configuration as the coating films 81 and 82 (see FIG. 2) of the first embodiment except that the coating films 281 and 282 are also formed on the end surfaces 10c and 20c.

A second bearing has the same configuration as the first bearing 201.

Similar to the first bearing 1 of the first embodiment, the first bearing 201 of the present embodiment can reduce friction by the coating films 281 and 282, and can reduce a phenomenon caused by creep or fretting. For example, adhesive wear due to metal contact can be reduced, and heat generation or occurrence of wear powder can be reduced. When a contact counterpart (the inner circumferential surface of the tubular portion 121, the outer circumferential surface of the shaft portion 111, the biasing member 102, and the like) is made of a material (steel, stainless steel, or the like) containing iron, wear resistance and a rust-preventive effect are further improved. Since the coating films 281 and 282 have a high rust-preventive effect, formation of rust on the first bearing 201, the second bearing, the tubular portion 121, the shaft portion 111 (see FIG. 1), and the like can be reduced even in a high-temperature and high-humidity environment.

In the first bearing 201 of the present embodiment, since the coating films 281 and 282 are also formed on the end surfaces 10c of the inner ring 10 and the end surfaces 20c of the outer ring 20, even when the end surfaces 10c and 20c abut against other members (for example, the tubular portion 121, the biasing member 102, and the like), effects such as wear reduction and heat generation reduction are achieved.

In the first bearing 201 shown in FIG. 3, the coating films 281 and 282 are formed on both the end surfaces 10c of the inner ring 10 and the end surfaces 20c of the outer ring 20, but the coating film may be formed on at least one of the end surfaces 10c of the inner ring 10 and the end surfaces 20c of the outer ring 20.

In the first bearing 201, the coating film 281 is formed on both the end surfaces 10c of the inner ring 10, but the coating film 281 may be formed on at least one of the two end surfaces 10c. The coating film 282 is formed on both the end surfaces 20c of the outer ring 20, but the coating film 282 may be formed on at least one of the two end surfaces 20c.

Third Embodiment

Figure 4:
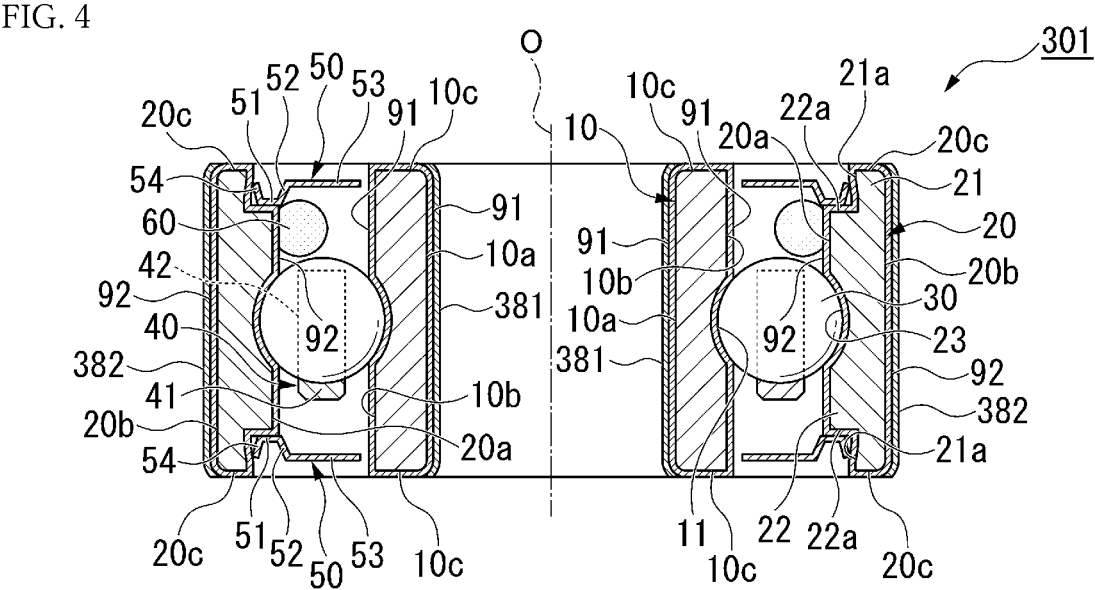
FIG. 4 is a longitudinal sectional view of a first rolling bearing according to a third embodiment.

FIG. 4 is a longitudinal sectional view of a first rolling bearing according to a third embodiment.

As shown in FIG. 4, in a first bearing 301, a rust prevention layer 91 is formed on an entire surface (the inner circumferential surface 10a, the outer circumferential surface 10b, and the end surfaces 10c) of the inner ring 10 by applying a rust-preventive oil. A rust prevention layer 92 is formed on an entire surface (the inner circumferential surface 20a, the outer circumferential surface 20b, and the end surfaces 20c) of the outer ring 20 by applying a rust-preventive oil. A rust-preventive oil is obtained by blending a known rust-preventive agent with a base oil such as a mineral oil or a synthetic oil.

The first bearing 301 has the same configuration as the first bearing 1 (see FIG. 2) of the first embodiment except that the rust prevention layers 91 and 92 are formed. The second bearing has the same configuration as the first bearing 301.

It is desirable that the rust-preventive agent does not contain a component which deteriorates bearing properties (a noise performance, torque smoothness, and the like) of the grease composition, for example, a hard particulate component.

A coating film 381 is formed on the rust prevention layer 91 formed on the inner circumferential surface 10a of the inner ring 10. A coating film 382 is formed on the rust prevention layer 92 formed on the outer circumferential surface 20b of the outer ring 20. The coating films 381 and 382 have the same configuration as the coating films 81 and 82 (see FIG. 2) of the first embodiment.

Since the first bearing 301 has the rust prevention layers 91 and 92, a rust-preventive effect is obtained even in a region where the coating films 381 and 382 are not formed (the outer circumferential surface 10b of the inner ring 10, the inner circumferential surface 20a of the outer ring 20, and the like).

Other Embodiments

In the fan motor 100 shown in FIG. 1, the coating films 81 and 82 are formed on the first bearing 1 and the second bearing 2, but in the fan motor (rotating device) of the embodiment, a coating film may be formed on a contact counterpart for the rolling bearing. For example, the coating film may be formed on both the rolling bearing and the contact counterpart, or the coating film may be formed only on the contact counterpart in the rolling bearing and the contact counterpart. That is, the coating film may be formed on at least one of the rolling bearing and the contact counterpart.

Figure 5:
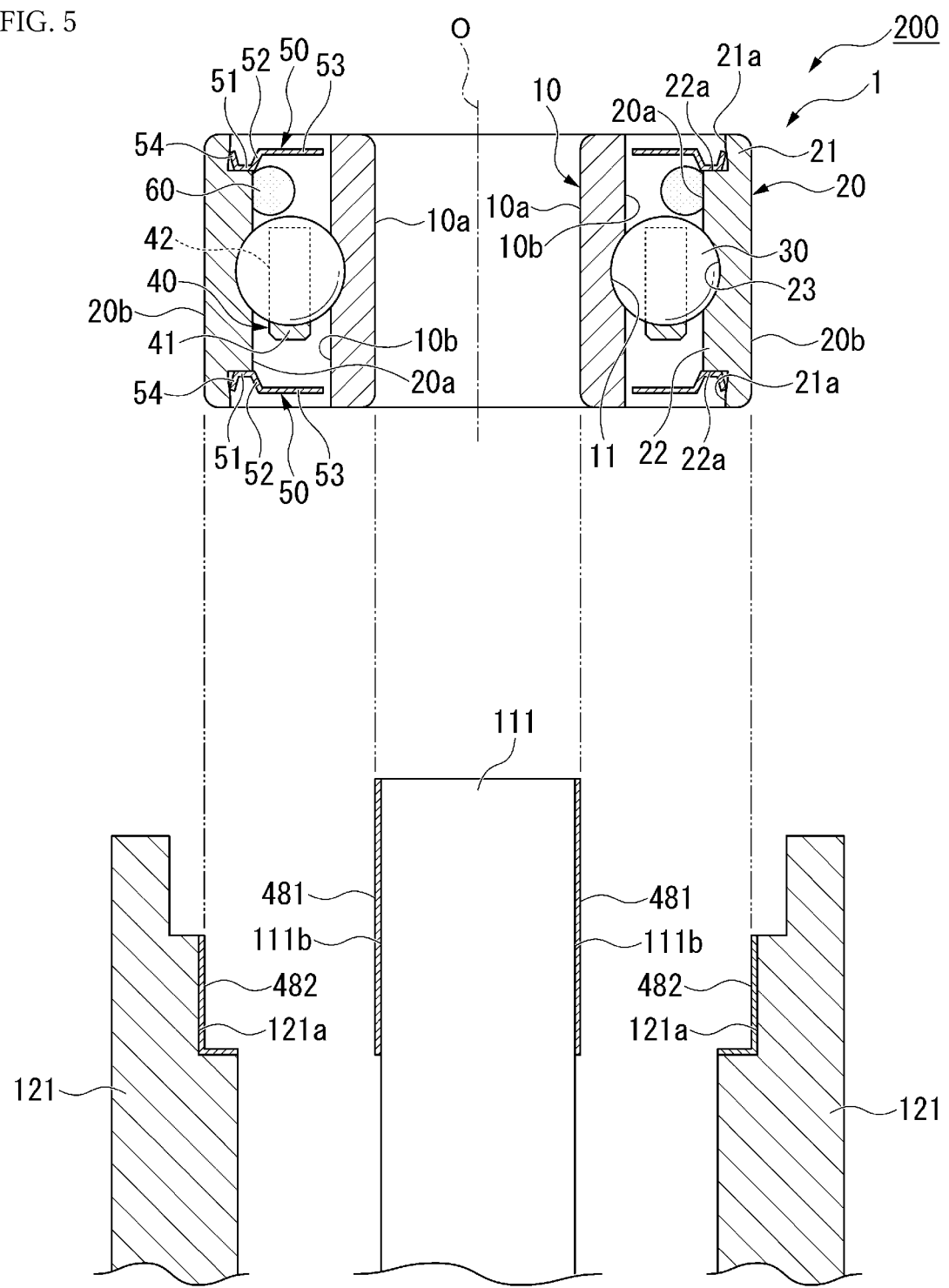
FIG. 5 is an exploded view showing a vertical section of a part of a fan motor according to another embodiment.

FIG. 5 is an exploded view showing a vertical section of a part of a fan motor 200 according to another embodiment.

As shown in FIG. 5, in the fan motor 200, a contact counterpart for the first bearing 1 is the outer circumferential surface of the shaft portion 111, the inner circumferential surface of the tubular portion 121, and the lower end portion of the biasing member 102 (see FIG. 1).

The coating film can be formed, for example, in one or more of the following (i) to (iii). (i) A region of the outer circumferential surface of the shaft portion 111 with which the bearings 1 and 2 are in contact. (ii) A region of the inner circumferential surface of the tubular portion 121 with which the bearings 1 and 2 are in contact. (iii) A region of a lower end surface of the biasing member 102 (see FIG. 1) with which the first bearing 1 is in contact.

The fan motor 200 is different from the fan motor 100 (see FIG. 1) in that no coating film is formed on the first bearing 1 and the second bearing 2, and coating films 481 and 482 are formed on the shaft portion 111 and the tubular portion 121, respectively.

The coating film 481 is formed in a region of an outer circumferential surface 111b of the shaft portion 111 with which inner rings 10 of the first bearing 1 and the second bearing 2 are in contact. The coating film 482 is formed in a region of an inner circumferential surface 121a of the tubular portion 121 with which outer rings 20 of the first bearing 1 and the second bearing 2 are in contact. The coating films 481 and 482 have the same configuration as the coating films 81 and 82 (see FIG. 2).

In the fan motor 200 of the present embodiment, since the coating films 481 and 482 are formed on the shaft portion 111 and the tubular portion 121, it is possible to reduce friction and to reduce a phenomenon caused by creep or fretting. For example, adhesive wear due to metal contact can be reduced, and heat generation or occurrence of wear powder can be reduced. Formation of rust can be reduced even in a high-temperature and high-humidity environment.

The invention is not limited to the embodiments described above with reference to the drawings, and various modifications are conceivable within a technical scope thereof.

In the above embodiments, the fan motor is shown as the rotating device, but the rotating device is not limited thereto. For example, the invention may be applied to a dental hand piece, a spindle motor of a hard disk drive, and the like as the rotating device.

In the fan motor 200 shown in FIG. 5, the coating film is not formed on the first bearing 1, but the coating film (see FIG. 2) may be formed on the first bearing 1. In the fan motor 200 shown in FIG. 5, the coating film is formed on both the outer circumferential surface 111b of the shaft portion 111 and the inner circumferential surface 121a of the tubular portion 121, but the coating film may be formed on at least one of the outer circumferential surface 111b and the inner circumferential surface 121a.

What is claimed is:

1. A rolling bearing comprising:
an inner ring and an outer ring disposed coaxially with each other; and
a rolling element and grease disposed between the inner ring and the outer ring,
wherein a coating film is formed on an inner circumferential surface of the inner ring and an outer circumferential surface of the outer ring, the coating film containing a mixture of calcium sulfonate and calcium carbonate or a compound obtained from calcium sulfonate and calcium carbonate, and
wherein the coating film does not reside on the outer circumferential surface of the inner ring nor on the inner circumferential surface of the outer ring.

2. The rolling bearing according to claim 1, wherein the coating film is formed on at least one of an end surface of the inner ring in an axial direction and an end surface of the outer ring in the axial direction.

3. The rolling bearing according to claim 1, wherein the coating film contains at least one of a calcium soap, a calcium complex soap, and a calcium salt.

4. The rolling bearing according to claim 1, wherein the coating film contains a base oil.

5. The rolling bearing according to claim 1, wherein a rust prevention layer is formed on an entire surface of the inner ring and an entire surface of the outer ring, and the coating film is formed on the rust prevention layer.

6. The rolling bearing according to claim 1, wherein the coating film contains a solid lubricant.

7. A rotating device comprising:
the rolling bearing according to claim 1;
a rotating body having a shaft portion; and
a base portion supporting the rotating body, wherein the rolling bearing is mounted on the base portion and rotatably supports the shaft portion.

8. A method for manufacturing a rolling bearing, the rolling bearing comprising a rolling element and grease disposed between an inner ring and an outer ring, the inner ring and the outer ring disposed coaxially with each other, the method for manufacturing the rolling bearing comprising:
forming a coating film by applying, to an inner circumferential surface of the inner ring and an outer circumferential surface of the outer ring, a coating film composition containing a mixture of calcium sulfonate and calcium carbonate or containing a compound obtained from calcium sulfonate and calcium carbonate,
wherein the applying comprises rubbing the coating film composition with an application member against the inner circumferential surface of the inner ring and the outer circumferential surface of the outer ring, and the coating film is not formed on the outer circumferential surface of the inner ring nor on the inner circumferential surface of the outer ring.

* * * * *